Figure 1:
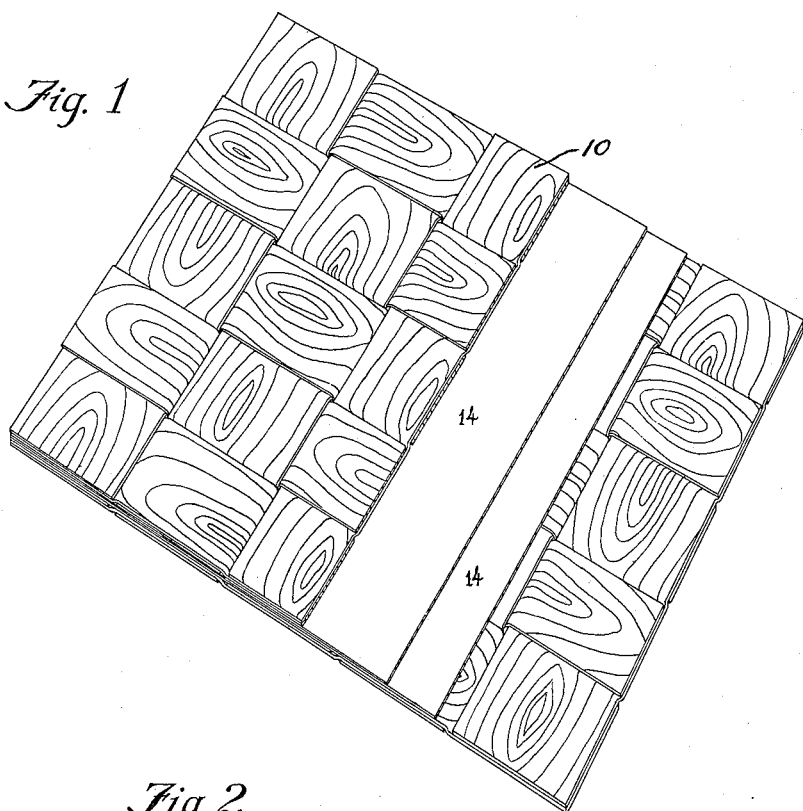

April 8, 1952  H. H. THOMPSON  2,592,080

METHOD OF MOLDING DISHLIKE ARTICLES

Filed June 6, 1947

INVENTOR.
Howard Thompson
BY

Patented Apr. 8, 1952

2,592,080

UNITED STATES PATENT OFFICE 2,592,080

METHOD OF MOLDING DISHLIKE ARTICLES

Howard H. Thompson, Minneapolis, Minn., assignor to Weavewood, Inc., Minneapolis, Minn., a corporation of Minnesota Application June 6, 1947, Serial No. 753,047

4 Claims. (Cl. 154—83)

This invention relates to improvements in methods of making wood veneer articles of dishlike shape and articles so produced. In a particular embodiment, the invention contemplates the molding of bowl or disk-like articles such as kitchen or table ware from wood veneers.

In the molding of resin impregnated non-elastic sheet material into arcuate or dish-like forms it is well known that the sheet will have a tendency to constrict or wrinkle at the curved or arcuate areas. This is particularly true where wood veneers are employed and articles so compounded therefrom are characterized by a weakened structure at the wrinkled areas or present an unsightly appearance, or both. Attempts heretofore to eliminate such wrinkling have resulted in great restriction in the selection of materials or have necessitated rather complex molding operations making efficient and inexpensive production impossible.

It is an object of the present invention to mold wood veneers into permanent dish-like or concavo-convex form, preferably in laminated composition wherein the wood veneer may comprise a surface of the article and the article itself may have the appearance of being formed entirely of wood.

More particularly it is an object to employ wood veneers, or other suitable material in the form of loosely interwoven strips, impregnated with resin or the like, the strips being relatively slidable whereby, when the resulting sheet material is subjected to the molding operation, the various strips will adjust themselves at the constricted or curved areas of the form to avoid any tendency toward overlapping or wrinkling.

It is a further object to provide molded articles of wood veneer or other suitable material which have extreme strength and durability for minimum weight.

In a particular embodiment the invention, contemplates the use of strips of wood veneers of any desired thickness and in any suitable width. Such strips are loosely interwoven or interlaced in mat form in any of various patterns or designs with alternate strips preferably disposed perpendicularly. Prior to or subsequent to such interweaving the strips may be coated or impregnated, preferably the latter, with any suitable plastic or resinous material. Desirably, a thermo-setting resinous material, for example any well known phenolic, melamine or urea composition, is employed so that the resulting molded article may freely withstand high temperature and moisture, particularly in the production of kitchen or table articles and the like which may be subjected to the action of steam and boiling water in the same manner as conventional metal or ceramic articles. The invention also contemplates the use of other suitable material in loosely interwoven mat form, such as strips of paper which may carry designs or ornamentation.

The impregnated interwoven mat of wood veneer strips or other material is preferably employed as a surface layer in laminated composition with any suitable filler. I have found resin impregnated creped kraft paper to be particularly adaptable as a filler because of its stretchable character and one or any number of layers of such paper may be employed as fillers depending upon the thickness or other qualities desired in the molded article. Excellent results have been obtained with the use of creped paper stretchable both longitudinally and laterally.

According to the invention it is highly important that the interwoven veneer strips be relatively slidable to a certain extent, particularly the overlapped portions, and that this characteristic be maintained while the veneer mat is being formed into concavo-convex or dish-like shape during the molding operation. For this reason it usually is desirable to impregnate the veneer and permit it to dry prior to interweaving the strips to avoid any tendency of the strips to adhere together as well as to secure uniform impregnation.

During the molding operation the uniform laticed appearance of the veneer mat may necessarily become somewhat distorted, particularly at the curved areas of the article, due to relative sliding of the strips in adjusting the mat to the configuration of the mold. In the production of symmetrical articles, such distortion is uniform and, in any event, does not detract from the pleasing woven wood appearance of the molded article.

Figure 2:
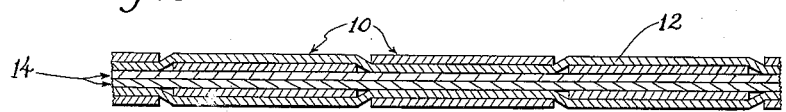
Figure 3:
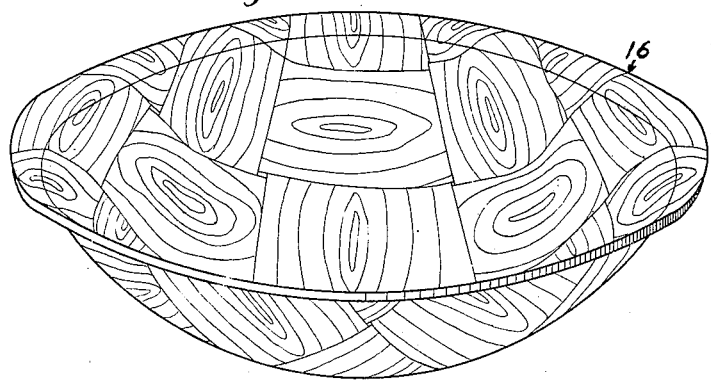
Figure 3:
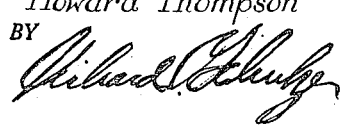

A specific example of the present invention is illustrated in the accompanying drawings, wherein, Fig. 1 is a perspective view, partly broken away, of outer mats of loosely interwoven and relatively slidable wood veneer strips assembled with inner filler layers prior to molding under conditions of resin reacting heat and pressure;

Fig. 2 is an enlarged transverse sectional view of the assembly shown in Fig. 1; and Fig. 3 is a perspective view of a completed bowl formed from the materials shown in Figs. 1 and 2.

In accordance with the specific example of the invention illustrated, I have successfully produced on a quantity basis bowls, such as individual salad bowls for table use, having the grained wood surface of the interwoven strips and having the appearance of being molded entirely of wood. For this purpose I employ outer veneer strips 10 approximately 1½ inches in width and from in the neighborhood of 1/45 to 1/85 inch in thickness and impregnated with a thermo-setting resin 12. Such mats are composed of ten of such strips transversely interlaced in the form of approximately an 8 inch square, as shown in Fig. 1. Several intermediate layers of thermo-setting resin impregnated single or double creped kraft paper 14 of similar dimensions are positioned between such wood veneer surface layers, as shown in Figs. 1 and 2. The resulting assembled composition is then inserted in the mold and the relatively slidable strips permitted substantially to adjust the interwoven mats to the mold form in such a manner as to avoid formation of wrinkles or overlaps in the molded article resulting from reactant heat and pressure, as indicated at 16 in Fig. 3. The surfaces of such molded bowls if desired may be made smooth under conditions whereby undulations in the interwoven outer layers are absorbed in the intermediate filler layers. Table ware produced in this manner, as is apparent, may be washed and sterilized just as metal and ceramic articles and has the additional advantage that it is less susceptible to denting and breakage.

It will be understood that the bowls above described are exemplary only of a great variety of articles for various uses and purposes which may be produced according to the invention and that the principles of the invention are limited only by the scope of the following claims.

I claim:

1. The method of molding sheet material into dish-like articles free from wrinkles at the curved portions thereof which comprises, providing a plurality of wood veneer strips impregnated with heat reactant resin, loosely interweaving said strips into a mat having the interwoven strips movable longitudinally and transversely relative to each other, providing a resin impregnated creped paper filler sheet, assembling the mat and filler sheet, imparting a dish-like form to the assembled mat and filler while maintaining selected strips in said relatively movable condition and subjecting the thus formed assembly to molding under conditions of resin reactant heat and pressure.

2. The method of molding sheet material into dish-like articles free from wrinkles at the curved portions thereof which comprises, providing a plurality of wood veneer strips impregnated with heat reactant resin, loosely interweaving said strips into a mat having the interwoven strips movable longitudinally and transversely relative to each other, providing a resin impregnated filler sheet of stretchable paper material, assembling the mat and filler sheet, imparting a dish-like form to the assembled mat and filler while maintaining selected strips in said relatively movable condition and subjecting the thus formed assembly to molding under conditions of resin reactant heat and pressure.

3. A dish shaped article molded from a filler sheet of resin impregnated creped paper and a surface sheet composed of resin impregnated strips of wood veneer loosely interwoven and relatively movable longitudinally and transversely prior of molding whereby the formation of wrinkles at curved portions of the molded article is avoided.

4. A dish shaped article molded from a filler sheet of resin impregnated stretchable paper material and a surface sheet composed of resin impregnated strips of wood veneer loosely interwoven and relatively movable longitudinally and transversely prior to molding whereby the formation of wrinkles at curved portions of the molded article is avoided.

HOWARD H. THOMPSON.

REFERENCES CITED

The following references are of record in the file of this patent:

UNITED STATES PATENTS

| Number | Name | Date |
|---|---|---|
| 2,162,598 | Atwood | June 13, 1939 |
| 2,373,738 | Atwood | Apr. 17, 1945 |
| 2,407,711 | Luth | Sept. 17, 1946 |